United States Patent
Mori

(10) Patent No.: US 8,654,658 B2
(45) Date of Patent: Feb. 18, 2014

(54) MOBILE COMMUNICATION SYSTEM, BASE STATION CONTROLLER, BASE STATION, MOBILE STATION, AND BASE STATION RADIO PARAMETER CONTROL METHOD

(75) Inventor: Shinichi Mori, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 550 days.

(21) Appl. No.: 12/597,584

(22) PCT Filed: Apr. 25, 2008

(86) PCT No.: PCT/JP2008/058085
§ 371 (c)(1),
(2), (4) Date: Jan. 7, 2010

(87) PCT Pub. No.: WO2008/136415
PCT Pub. Date: Nov. 13, 2008

(65) Prior Publication Data
US 2010/0135174 A1    Jun. 3, 2010

(30) Foreign Application Priority Data
Apr. 27, 2007   (JP) ................................. 2007-120262

(51) Int. Cl.
*H04L 12/26* (2006.01)
(52) U.S. Cl.
USPC ......... 370/252; 370/229; 370/333; 455/67.11
(58) Field of Classification Search
USPC ............ 370/229, 331–334; 455/67.11, 67.13, 455/423, 525; 375/224
See application file for complete search history.

(56) References Cited

U.S. PATENT DOCUMENTS

| 5,640,679 | A | * | 6/1997 | Lundqvist et al. | ............ 455/525 |
| 5,771,451 | A | * | 6/1998 | Takai et al. | ................... 455/442 |
| 6,351,649 | B1 |   | 2/2002 | Watanabe et al. |   |

(Continued)

FOREIGN PATENT DOCUMENTS

| JP | 10136442 A | 5/1998 |
| JP | 11-285062 A | 10/1999 |

(Continued)

OTHER PUBLICATIONS

Patent Abstracts of Japan, Publication No. 11-285062, dated Oct. 15, 1999, 1 page.

(Continued)

*Primary Examiner* — Michael Thier
*Assistant Examiner* — Vincelas Louis
(74) *Attorney, Agent, or Firm* — Osha Liang LLP

(57) ABSTRACT

A mobile communication system includes a condition reporting unit provided in a base station controller and configured to report to a mobile station via the target base station or another base station measurement and report conditions for determining whether to measure and report a reception quality level of a radio signal transmitted from the target base station; a measurement reporting unit provided in the mobile station and configured to measure the reception quality level of the radio signal if the measurement condition is satisfied and to report the measured reception quality level to the base station controller via the target base station or the other base station if the report condition is satisfied; and a radio parameter control unit provided in the base station controller and configured to control a radio parameter of the target base station or the other base station based on the reported reception quality level.

8 Claims, 9 Drawing Sheets

(56) References Cited

U.S. PATENT DOCUMENTS

| | | | |
|---|---|---|---|
| 6,445,917 B1* | 9/2002 | Bark et al. | 455/423 |
| 6,473,624 B1* | 10/2002 | Corbett et al. | 455/522 |
| 6,545,986 B1* | 4/2003 | Stellakis | 370/318 |
| 6,768,715 B2* | 7/2004 | Hsu et al. | 370/229 |
| 2002/0032032 A1* | 3/2002 | Haumont et al. | 455/436 |
| 2002/0045448 A1* | 4/2002 | Park et al. | 455/436 |
| 2004/0198234 A1* | 10/2004 | Wacker et al. | 455/67.13 |
| 2004/0259547 A1* | 12/2004 | Lau et al. | 455/436 |
| 2005/0163047 A1* | 7/2005 | McGregor et al. | 370/229 |
| 2006/0128371 A1* | 6/2006 | Dillon et al. | 455/423 |
| 2006/0276188 A1* | 12/2006 | Pekonen et al. | 455/423 |
| 2007/0072563 A1* | 3/2007 | Weaver | 455/115.1 |
| 2007/0129017 A1* | 6/2007 | Dalsgaard et al. | 455/67.11 |
| 2010/0290512 A1* | 11/2010 | Ghosh | 375/224 |

FOREIGN PATENT DOCUMENTS

| | | | |
|---|---|---|---|
| JP | 2003-500909 A | 1/2003 | |
| JP | 2007-110657 A | 4/2007 | |
| WO | 00/70897 A1 | 11/2000 | |
| WO | 2006097832 A1 | 9/2006 | |
| WO | 2007005030 A2 | 1/2007 | |

OTHER PUBLICATIONS

Shinichi Mori, Takatoshi Sugiyama, Narumi Umeda and Wireless Laboratories, NTT DoCoMo, Inc., Sep. 2005, B-5-106, IEICE, "Dynamic Coverage Forming Algorithm by Pilot Channel Power Control using Neighbor Cells Status," 7 pages.

International Search Report issued in PCT/JP2008/058085, mailed on Jun. 3, 2008, with translation, 7 pages.

Written Opinion issued in PCT/JP2008/058085, mailed on Jun. 3, 2008, 3 pages.

Chinese Office Action for Application No. 200880021718.1, mailed on Feb. 22, 2012 (8 pages).

Office Action for Chinese Application No. 200880021718.1 dated Sep. 20, 2012, with English translation thereof (13 pages).

Japanese Office Action for Application No. 2009-512981, mailed on May 29, 2012 (3 pages).

Office Action for Japanese Patent Application No. 2009-512981 mailed Aug. 28, 2012, with English translation thereof (4 pages).

Patent Abstract for Japanese Publication No. 10-136442 published May 22, 1998 (1 page).

* cited by examiner

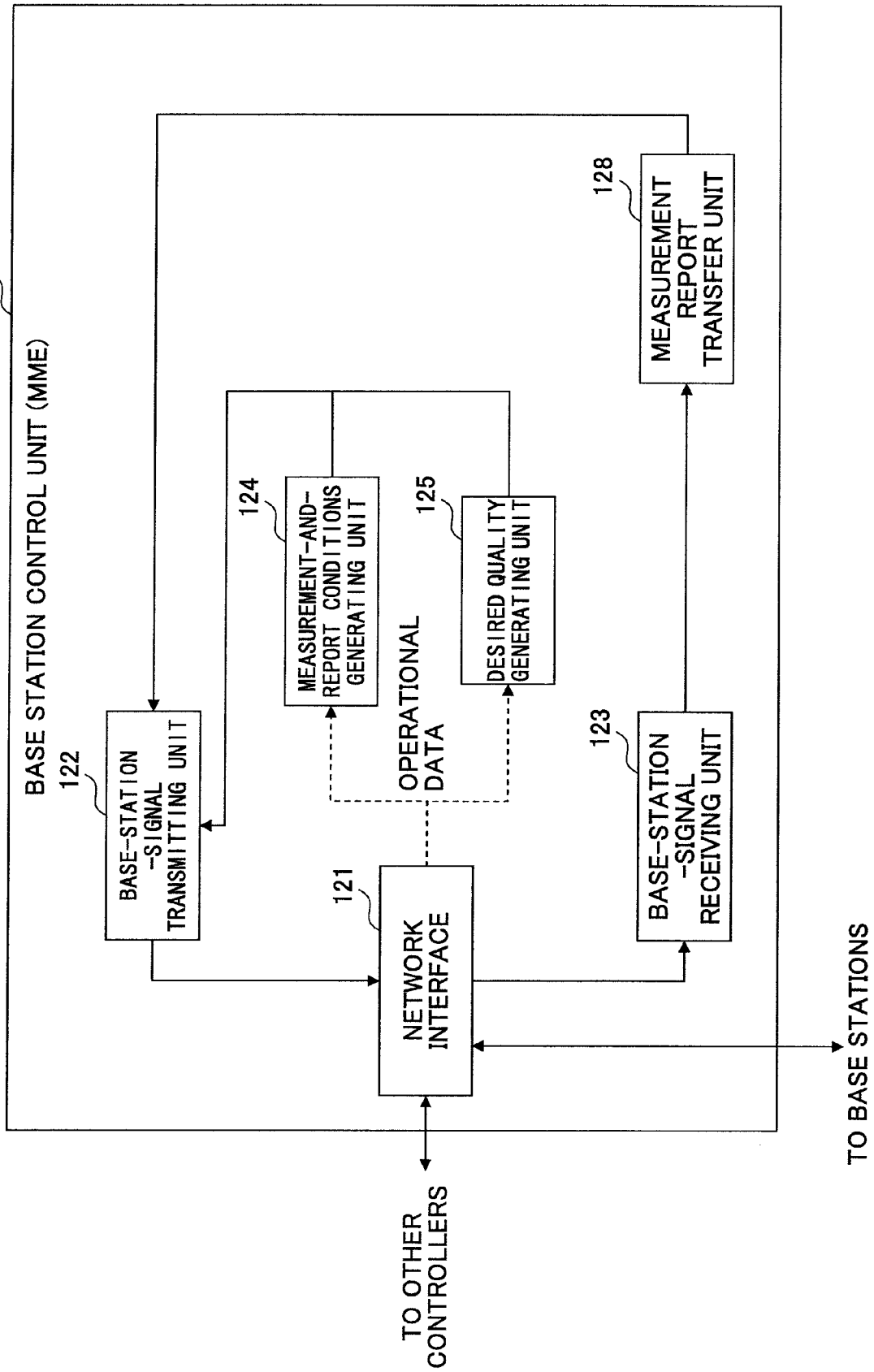

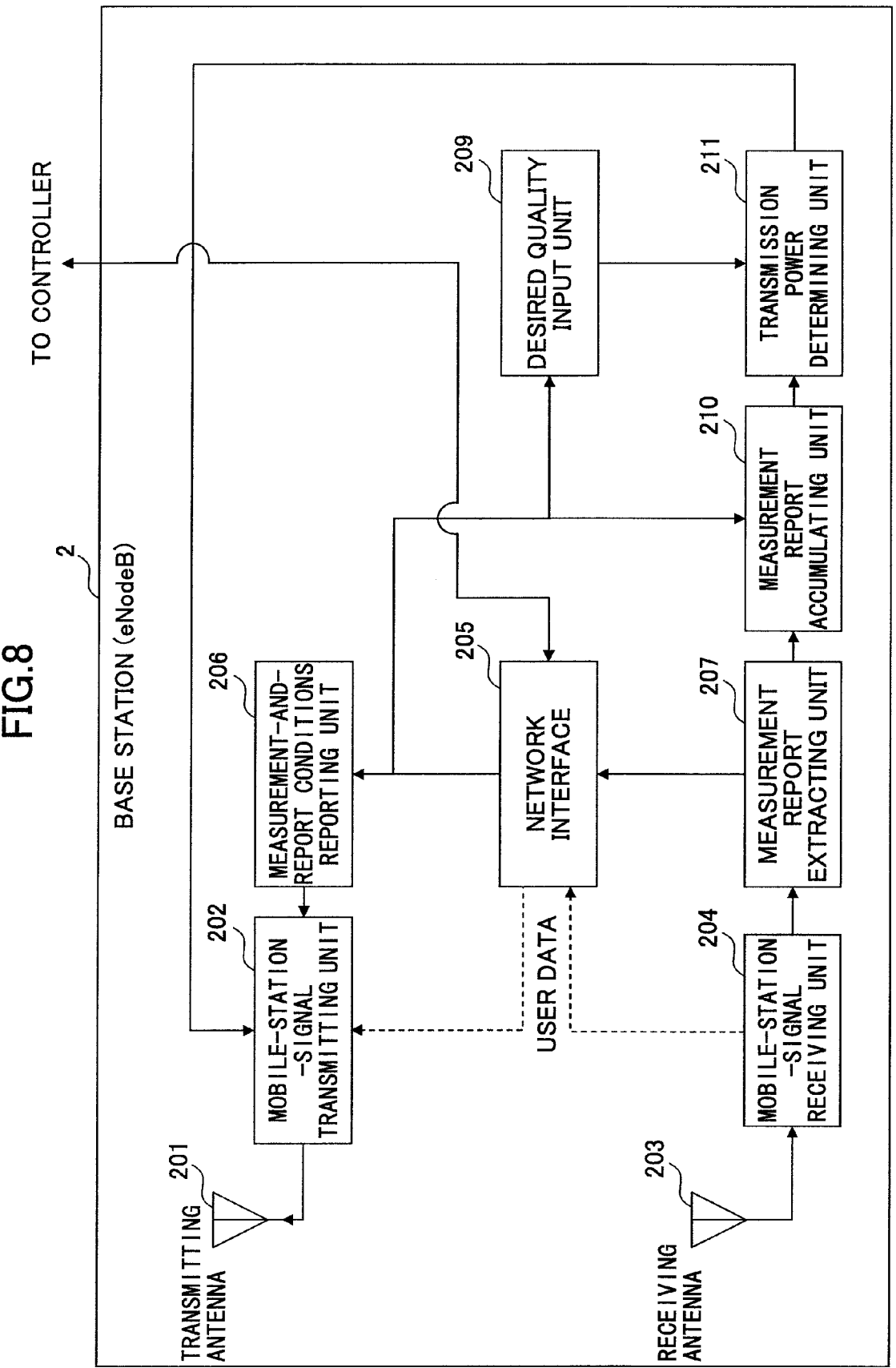

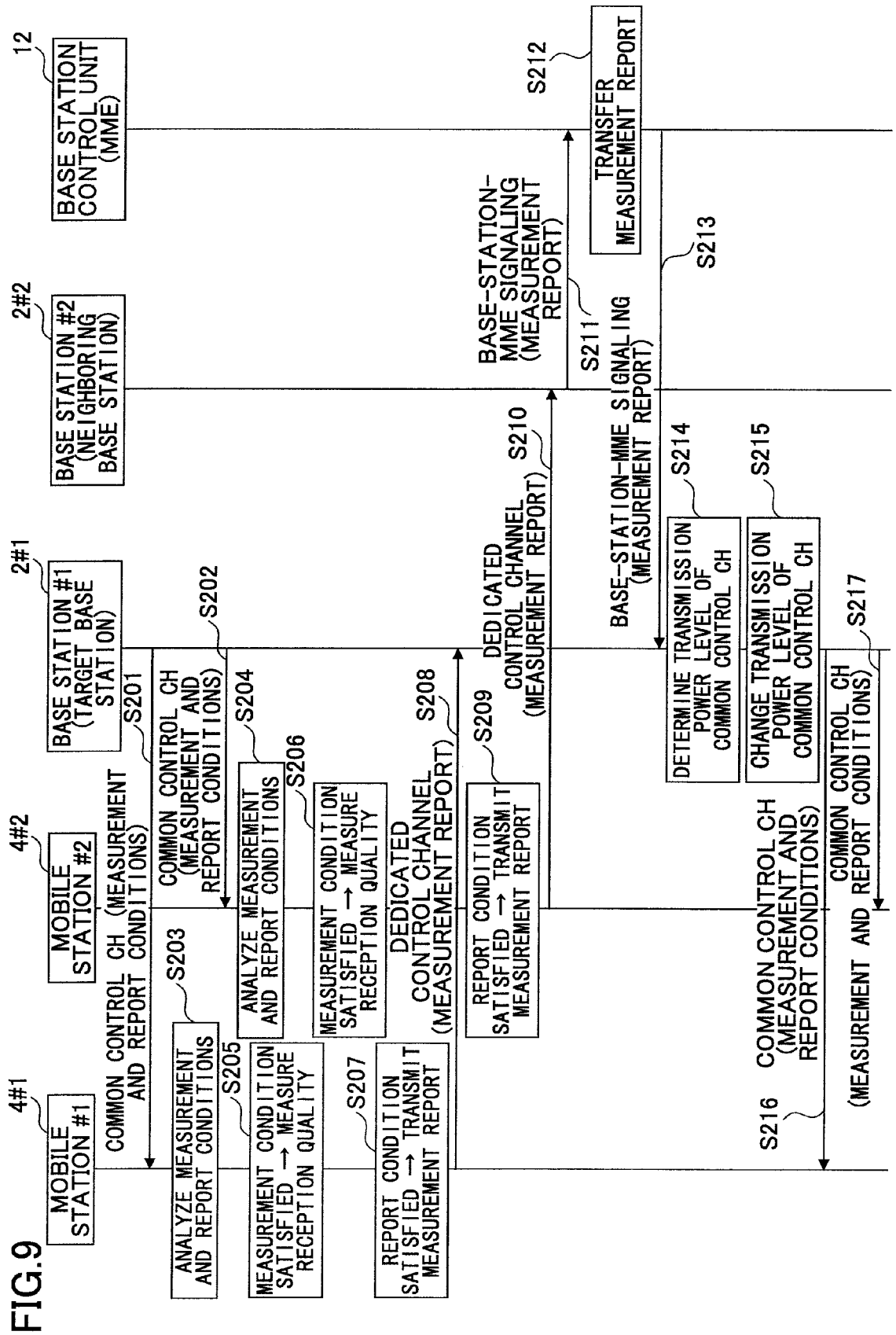

MOBILE COMMUNICATION SYSTEM, BASE STATION CONTROLLER, BASE STATION, MOBILE STATION, AND BASE STATION RADIO PARAMETER CONTROL METHOD

TECHNICAL FIELD

The present invention relates to a mobile communication system, a base station controller, a base station, a mobile station, and a base station radio parameter control method.

BACKGROUND ART

To smoothly operate a mobile communication system, it is necessary to properly configure radio parameters of base stations such as the transmission power level of a common control channel. In a mobile communication system, a base station periodically transmits a common control channel to the entire cell and each mobile station is enabled to perform basic operations by receiving the common control channel. If the transmission power level of the common control channel is too low, the reception quality of the common control channel is reduced and the mobile station may not be able to operate properly. Meanwhile, if the transmission power level is too high, the common control channel causes interference with other cells. This in turn reduces the reception quality and prevents proper operations in other cells.

In conventional methods, the transmission power level of the common control channel is determined and set as follows:

(1) A desired reception quality level (represented, for example, by a bit error rate (BER), a frame error rate (FER), and/or a block error rate (BLER)) is defined and a degraded area percentage (area ratio) indicating the percentage of a portion of a service area where the reception quality is allowed to be below the desired reception quality level is defined.

(2) The probability distribution of geometry in the service area (distribution of probabilities of occurrence of geometry values) is obtained by a system-level simulation (simulation of the received power level under a multi-cell environment) based on an assumed maximum radio network load (maximum transmission power of all base station sectors), an assumed regular arrangement of cells, and assumed propagation losses (obtained taking into account random numbers representing the influence of shading caused, for example, by topography or buildings), and geometry values corresponding to the degraded area percentage are identified based on the probability distribution of geometry. Here, the geometry indicates values obtained by the following formula: total received power from selected base station/(total received power from other base stations+thermal noise power), and the selected base station indicates a base station with the lowest propagation loss at a given point.

(3) A link-level simulation is performed based on the geometry and an assumed multipath propagation delay and with the received power from other base stations approximated to the thermal noise. In the link-level simulation, minimum transmission power levels that are enough to satisfy the desired reception quality level at respective points associated with the geometry values corresponding to the degraded area percentage are obtained by gradually increasing the transmission power (the ratio in the maximum transmission power of the corresponding base station sector) of the common control channel.

(4) Based on the obtained results, the transmission power level of the common control channel is set in each actual base station manually by a network administrator.

The applicant was not able to find any published prior-art document related to the present invention before the filing date of the present application. Therefore, no prior-art document information is included in the specification.

DISCLOSURE OF INVENTION

Problems to be Solved by the Invention

In conventional methods, radio parameters of a base station such as the transmission power level of the common control channel are determined and set as described above. However, this approach has problems as described below.

(1) Since the system-level simulation is performed based on an assumed regular arrangement of cells and propagation loss, the accuracy of the simulation may be reduced due to differences between the assumed regular arrangement of cells and propagation loss and the actual arrangement of cells and propagation loss. As a result, a value obtained by the simulation may become inappropriate and the reception quality may be reduced.

(2) Since the link-level simulation is performed based on an assumed propagation delay, the accuracy of the simulation may be reduced due to a difference between the assumed propagation loss and the actual propagation loss. As a result, a value obtained by the simulation may become inappropriate and the reception quality may be reduced.

(3) Since the simulations are performed based on assumed radio unit configurations of the base station and the mobile station, the accuracy of the simulations may be reduced. As a result, values obtained by the simulations may become inappropriate and the reception quality may be reduced.

(4) Even if the values obtained by simulations are appropriate at the time they are set, the values may become inappropriate due to environmental changes and the reception quality may be reduced. In such a case, it is necessary to simulate and reset the values again.

(5) Since simulations and configurations of base stations are performed manually, the workload of the network administrator is high.

One object of the present invention is to provide a mobile communication system, a base station controller, a base station, a mobile station, and a base station radio parameter control method that make it possible to prevent one or more of the above problems caused by simulation errors and environmental changes as well as to reduce the workload of a network administrator.

Means for Solving the Problems

According to a first aspect of the present invention, a mobile communication system includes a condition reporting unit provided in a base station controller, which is an upper node of a target base station, and configured to report to a mobile station via the target base station or another base station a measurement condition and a report condition used by the mobile station to determine whether to measure and report a reception quality level of a radio signal transmitted from the target base station; a measurement reporting unit provided in the mobile station and configured to measure the reception quality level of the radio signal transmitted from the target base station if the measurement condition is satisfied and to report the measured reception quality level to the base station controller via the target base station or the other base station if the report condition is satisfied; and a radio parameter control unit provided in the base station controller and configured to control a radio parameter of the target base station or the other base station based on the reported reception quality level.

According to a second aspect of the present invention, a mobile communication system includes a condition reporting unit provided in a base station controller, which is an upper node of a target base station, and configured to report to a mobile station via the target base station or another base station a measurement condition and a report condition used by the mobile station to determine whether to measure and report a reception quality level of a radio signal transmitted from the target base station; a measurement reporting unit provided in the mobile station and configured to measure the reception quality level of the radio signal transmitted from the target base station if the measurement condition is satisfied and to report the measured reception quality level to the target base station directly or via the other base station and the base station controller if the report condition is satisfied; and a radio parameter control unit provided in the target base station and configured to control a radio parameter of the target base station or the other base station based on the reported reception quality level.

According to a third aspect of the present invention, a base station controller includes a condition reporting unit configured to report to a mobile station via a target base station or another base station a measurement condition and a report condition used by the mobile station to determine whether to measure and report a reception quality level of a radio signal transmitted from the target base station; and a measurement receiving unit configured to receive the measured reception quality level of the radio signal transmitted from the target base station from the mobile station via the target base station or the other base station; and a radio parameter control unit configured to control a radio parameter of the target base station or the other base station based on the received reception quality level.

According to a fourth aspect of the present invention, a base station controller includes a condition reporting unit configured to report to a mobile station via a target base station or another base station a measurement condition and a report condition used by the mobile station to determine whether to measure and report a reception quality level of a radio signal transmitted from the target base station; and a measurement transfer unit configured to receive the measured reception quality level of the radio signal transmitted from the target base station from the mobile station via the other base station and to transfer the received reception quality level to the target base station.

According to a fifth aspect of the present invention, a base station includes a condition reporting unit configured to receive from a base station controller a measurement condition and a report condition used by a mobile station to determine whether to measure and report a reception quality level of a radio signal transmitted from a target base station that is either its own base station or another base station and to report the measurement condition and the report condition to the mobile station; a measurement transfer unit configured to receive from the mobile station the measured reception quality level of the radio signal transmitted from the target base station and to transfer the received reception quality level to the base station controller; and a parameter setting unit configured to set a radio parameter transmitted from the base station controller in its own base station.

According to a sixth aspect of the present invention, a base station includes a condition reporting unit configured to receive from a base station controller a measurement condition and a report condition used by a mobile station to determine whether to measure and report a reception quality level of a radio signal transmitted from a target base station that is either its own base station or another base station and to report the measurement condition and the report condition to the mobile station; a measurement receiving unit configured to receive the measured reception quality level of the radio signal transmitted from the target base station from the mobile station directly or via the other base station and the base station controller; and a radio parameter control unit configured to control a radio parameter of its own base station or the other base station based on the received reception quality level.

According to a seventh aspect of the present invention, a mobile station includes a condition receiving unit configured to receive from a base station controller via a target base station a measurement condition and a report condition for determining whether to measure and report a reception quality level of a radio signal transmitted from the target base station; and a measurement reporting unit configured to measure the reception quality level of the radio signal transmitted from the target base station if the measurement condition is satisfied and to report the measured reception quality level to the base station controller via the target base station or another base station if the report condition is satisfied.

According to an eighth aspect of the present invention, a mobile station includes a condition receiving unit configured to receive from a base station controller via a target base station a measurement condition and a report condition for determining whether to measure and report a reception quality level of a radio signal transmitted from the target base station; and a measurement reporting unit configured to measure the reception quality level of the radio signal transmitted from the target base station if the measurement condition is satisfied and to report the measured reception quality level to the target base station directly or via another base station if the report condition is satisfied.

According to a ninth aspect of the present invention, a base station radio parameter control method includes a condition reporting step, performed by a base station controller that is an upper node of a target base station, of reporting to a mobile station via the target base station a measurement condition and a report condition used by the mobile station to determine whether to measure and report a reception quality level of a radio signal transmitted from the target base station; a measurement reporting step, performed by the mobile station, of measuring the reception quality level of the radio signal transmitted from the target base station if the measurement condition is satisfied and reporting the measured reception quality level to the base station controller via the target base station or another base station if the report condition is satisfied; and a radio parameter control step, performed by the base station controller, of controlling a radio parameter of the target base station or the other base station based on the reported reception quality level.

According to a tenth aspect of the present invention, a base station radio parameter control method includes a condition reporting step, performed by a base station controller that is an upper node of a target base station, of reporting to a mobile station via the target base station a measurement condition and a report condition used by the mobile station to determine whether to measure and report a reception quality level of a radio signal transmitted from the target base station; a measurement reporting step, performed by the mobile station, of measuring the reception quality level of the radio signal transmitted from the target base station if the measurement condition is satisfied and reporting the measured reception quality level to the base station controller via the target base station or another base station if the report condition is satisfied; and a radio parameter control step, performed by the base station controller, of controlling a radio parameter of the target base station or the other base station based on the reported reception quality level.

Advantageous Effect of the Invention

An aspect of the present invention provides a mobile communication system, a base station controller, a base station, a mobile station, and a base station radio parameter control method that make it possible to prevent problems caused by simulation errors and environmental changes as well as to reduce the workload of a network administrator.

BRIEF DESCRIPTION OF THE DRAWINGS

FIG. 7 is a block diagram illustrating an exemplary configuration of a base station control unit according to a second embodiment;

FIG. 8 is a block diagram illustrating an exemplary configuration of a base station according to the second embodiment; and FIG. 9 is a sequence chart showing an exemplary process according to the second embodiment.

EXPLANATION OF REFERENCES

Figure 1:
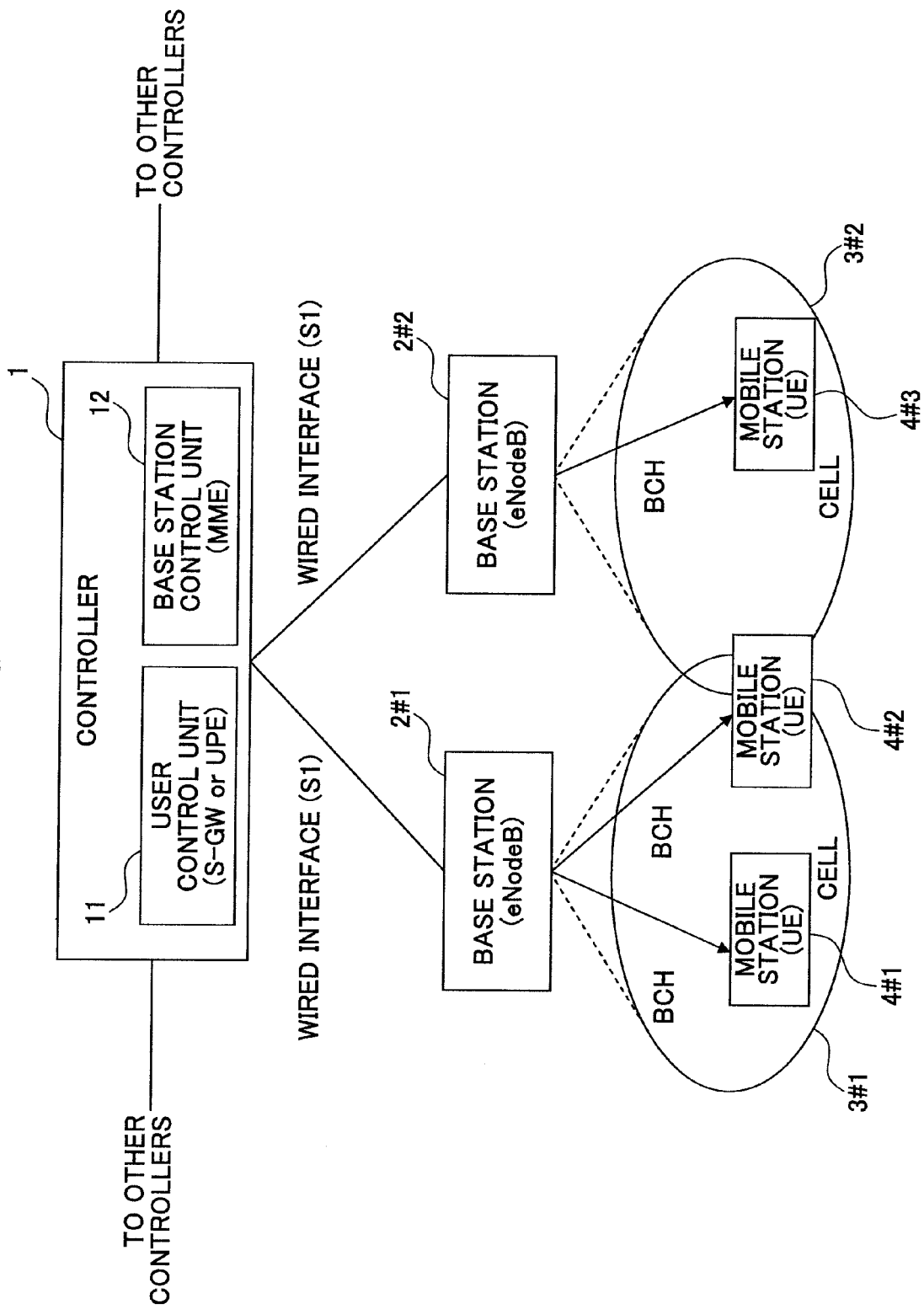
FIG. 1 is a drawing illustrating an exemplary configuration of a mobile communication system according to an embodiment of the present invention.

1 Controller
11 User control unit
12 Base station control unit
121 Network interface
122 Base-station-signal transmitting unit
123 Base-station-signal receiving unit
124 Measurement-and-report conditions generating unit
125 Desired quality generating unit
126 Measurement report accumulating unit
127 Transmission power determining unit
128 Measurement report transfer unit
2, 2#1, 2#2 Base station
201 Transmitting antenna
202 Mobile-station-signal transmitting unit
203 Receiving antenna
204 Mobile-station-signal receiving unit
205 Network interface
206 Measurement-and-report conditions reporting unit
207 Measurement report extracting unit
208 Transmission power setting unit
209 Desired quality input unit
210 Measurement report accumulating unit
211 Transmission power determining unit
3#1, 3#2 Cell 4, 4#1-4#3 Mobile station
401 Transmitting antenna
402 Base-station-signal transmitting unit
403 Receiving antenna
404 Base-station-signal receiving unit
405 User interface
406 Measurement condition determining unit
407 Reception quality measuring unit
408 Statistical processing unit
409 Memory
410 Report condition determining unit

BEST MODE FOR CARRYING OUT THE INVENTION

Preferred embodiments of the present invention are described below. In the descriptions below, the transmission power level of a common control channel of a base station is used as an example of a radio parameter to be controlled. However, the descriptions may also be applied to other radio parameters such as a modulation and coding scheme (MCS) level.

FIG. 1 is a drawing illustrating an exemplary configuration of a mobile communication system according to an embodiment of the present invention.

In FIG. 1, a controller 1 is connected via dedicated lines to multiple neighboring controllers according to a mesh topology. The controller 1 includes a user control unit (serving gateway (S-GW) or user plane entity (UPE)) 11 for controlling user data, and a base station control unit (mobility management entity (MME)) 12 for controlling base stations.

Multiple base stations (eNodeB) 2#1 and 2#2 are connected to the controller 1 via wired interfaces S1. A sector or area covered by the base station 2#1 is called cell 3#1 and a sector or area covered by the base station 2#2 is called cell 3#2. Adjacent cells 3#1 and 3#2 are slightly overlapped to smoothly perform handover.

In the cells 3#1 and 3#2, there are mobile stations (user equipment (UE)) 4#1, 4#2, and 4#3 being carried by users. Here, it is assumed that the mobile stations 4#1 and 4#2 receive a common control channel such as a broadcast channel (BCH) from the base station 2#1 and the mobile station 4#3 receives a common control channel such as a BCH from the base station 2#2. The common control channel may also be called P-BCH, DL-SCH for BCCH transmission, or DPCCH.

In this embodiment, the mobile stations 4#1, 4#2, and 4#3 in a service area composed of the cells 3#1 and 3#2 are requested to measure the reception quality levels of common control channels transmitted from the base stations 2#1 and 2#2; appropriate transmission power levels of the common control channels of the base stations 2#1 and 2#2 are automatically calculated based on accumulated data of the measurements reported by the mobile stations 4#1, 4#2, and 4#3 (measurement reports) to the network; and the calculated transmission power levels are set in the base stations 2#1 and 2#2. This configuration makes it possible to prevent problems caused by simulation errors and environmental changes as well as to reduce the workload of a network administrator.

Accumulation of measurement reports and calculation of transmission power levels may be performed either by the base station control unit 12 of the controller 1 or the respective base stations 2#1 and 2#2.

Figure 2:
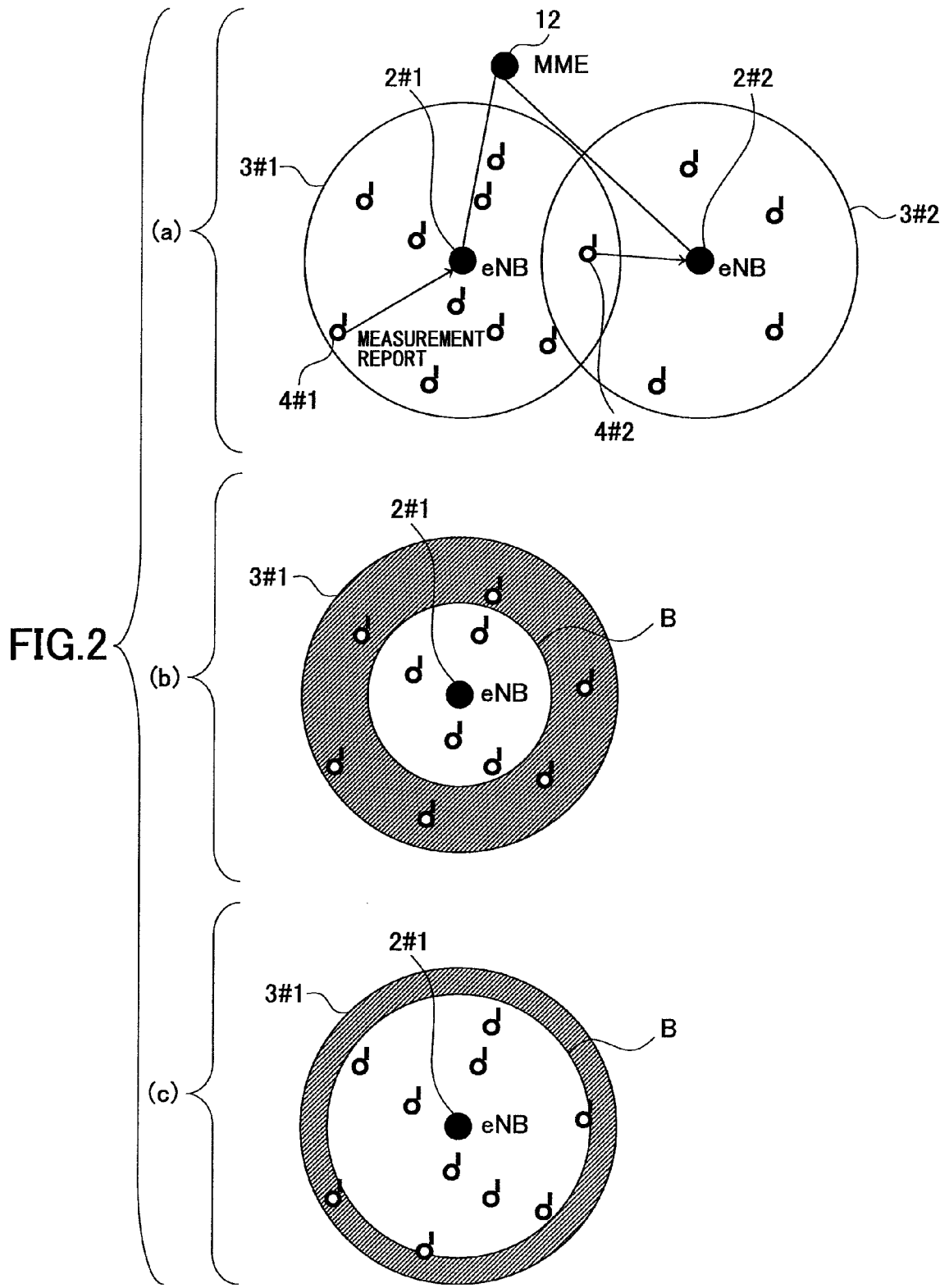
FIG. 2 is a drawing illustrating a process of transmitting measurement reports and a control process based on the measurement reports.

FIG. 2 is a drawing illustrating a process of transmitting measurement reports from mobile stations and a control process based on the measurement reports.

FIG. 2(a) shows an example where the mobile station 4#1 in the cell 3#1 transmits a measurement report (a measured reception quality level of a common control channel transmitted from the base station 2#1) to the base station 2#1, and the mobile station 4#2 located in an overlapping portion of the cells 3#1 and 3#2 transmits measurement reports (measured reception quality levels of common control channels transmitted from the base stations 2#1 and 2#2). Also, other mobile stations transmit measurement reports to the corresponding base stations in a similar manner.

FIG. 2(b) shows reception quality levels in the cell 3#1 of the base station 2#1 obtained based on accumulated measurement reports. A desired reception quality level required in the system is not satisfied in a shaded portion outside of a border line B. The base station control unit 12 or the base station 2#1 automatically calculates a transmission power level of the common control channel based on the accumulated measurement reports and taking into account the degraded area percentage indicating the percentage of a portion of the service area where the reception quality is allowed to be below the desired reception quality level, and sets the calculated transmission power level in the base station 2#1.

FIG. 2(c) shows reception quality levels after the transmission power level is adjusted. In FIG. 2(c), the border line B has moved to a position close to the edge of the cell 3#1 and the desired reception quality level is satisfied in portions of the service area other than a portion corresponding to the degraded area percentage.

First Embodiment

According to a first embodiment, functions for implementing the present invention are provided in the base station control unit 12 of the controller 1.

In this embodiment, it is assumed that the mobile communication system has a configuration as shown in FIG. 1.

Figure 3:
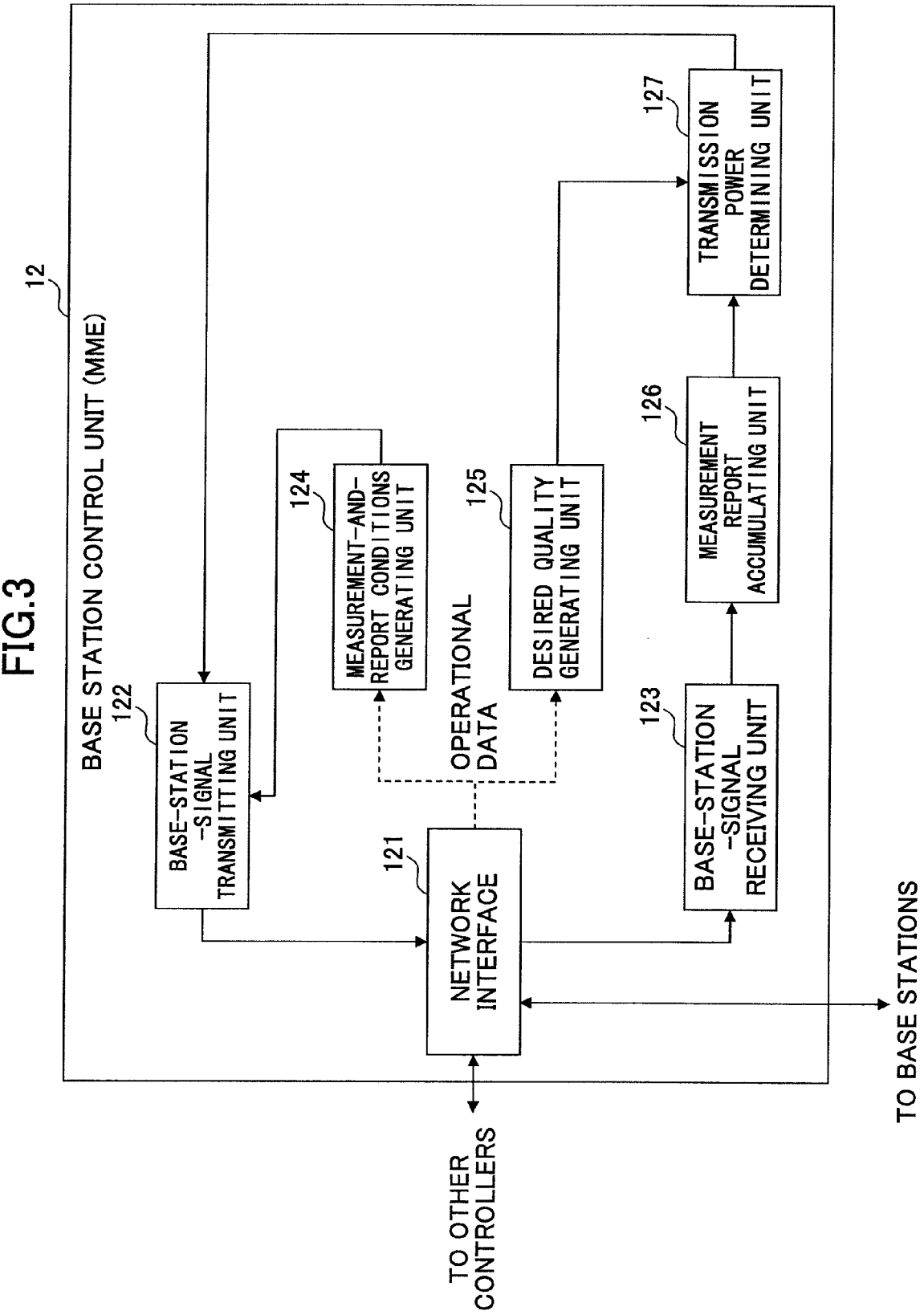
FIG. 3 is a block diagram illustrating an exemplary configuration of a base station control unit according to a first embodiment.

FIG. 3 is a block diagram illustrating an exemplary configuration of the base station control unit 12 according to the first embodiment.

As shown in FIG. 3, the base station control unit 12 includes a network interface 121 that communicates with other controllers and base stations belonging to the controller 1 via fixed lines; a base-station-signal transmitting unit 122 for transmitting signals to the base stations via the network interface 121; and a base-station-signal receiving unit 123 for receiving measurement reports from the base stations via the network interface 121.

The base station control unit 12 also includes a measurement-and-report conditions generating unit 124 that generates a measurement condition (a condition for determining whether to measure the reception quality) and a report condition (a condition for determining whether to report a measurement report) for mobile stations based on operational data received via the network interface 121, and requests the base-station-signal transmitting unit 122 to transmit the generated conditions to the corresponding base stations. Examples of the measurement condition include "if a request is received from the network", "if a predetermined period of time has passed after a request is received from the network", "if it is a predetermined time slot", "if one of base stations being detected becomes undetectable", "if a base station is newly detected and its reception level exceeds a threshold", and "if the mobile station has moved to another cell". Examples of the report condition include "if a request is received from the network", "if a predetermined period of time has passed after a request is received from the network", "if it is a predetermined time slot", and "if the mobile station moves to another tracking area (TA) for location registration". The measurement-and-report conditions generating unit 124 may be configured to request only a certain group of mobile stations (for example, mobile stations whose battery energy levels are high or mobile stations belonging to a certain access service class) to measure and report the reception quality.

The base station control unit 12 also includes a desired quality generating unit 125 that generates a desired quality level based on operational data received via the network interface 121 and inputs the generated desired quality level to a transmission power determining unit 127 described later. The desired quality level is represented, for example, by a BER, a FER, a BLER, and/or the number of tries needed to complete demodulation.

The base station control unit 12 further includes a measurement report accumulating unit 126 that accumulates measurement reports received by the base-station-signal receiving unit 123 and performs statistical processing on the accumulated measurement reports (e.g., obtains an average, a median, and/or a probability distribution of the measurement reports); and the transmission power determining unit 127 that determines an appropriate transmission power level based on the results of the statistical processing output from the measurement report accumulating unit 126 and the desired quality level input from the desired quality generating unit 125 and requests the base-station-signal transmitting unit 122 to transmit the determined transmission power level to a target base station. The determined transmission power level is set in the target base station. Here, the determined transmission power level may also be set in base stations other than the target base station whose common control channel is measured.

Figure 4:
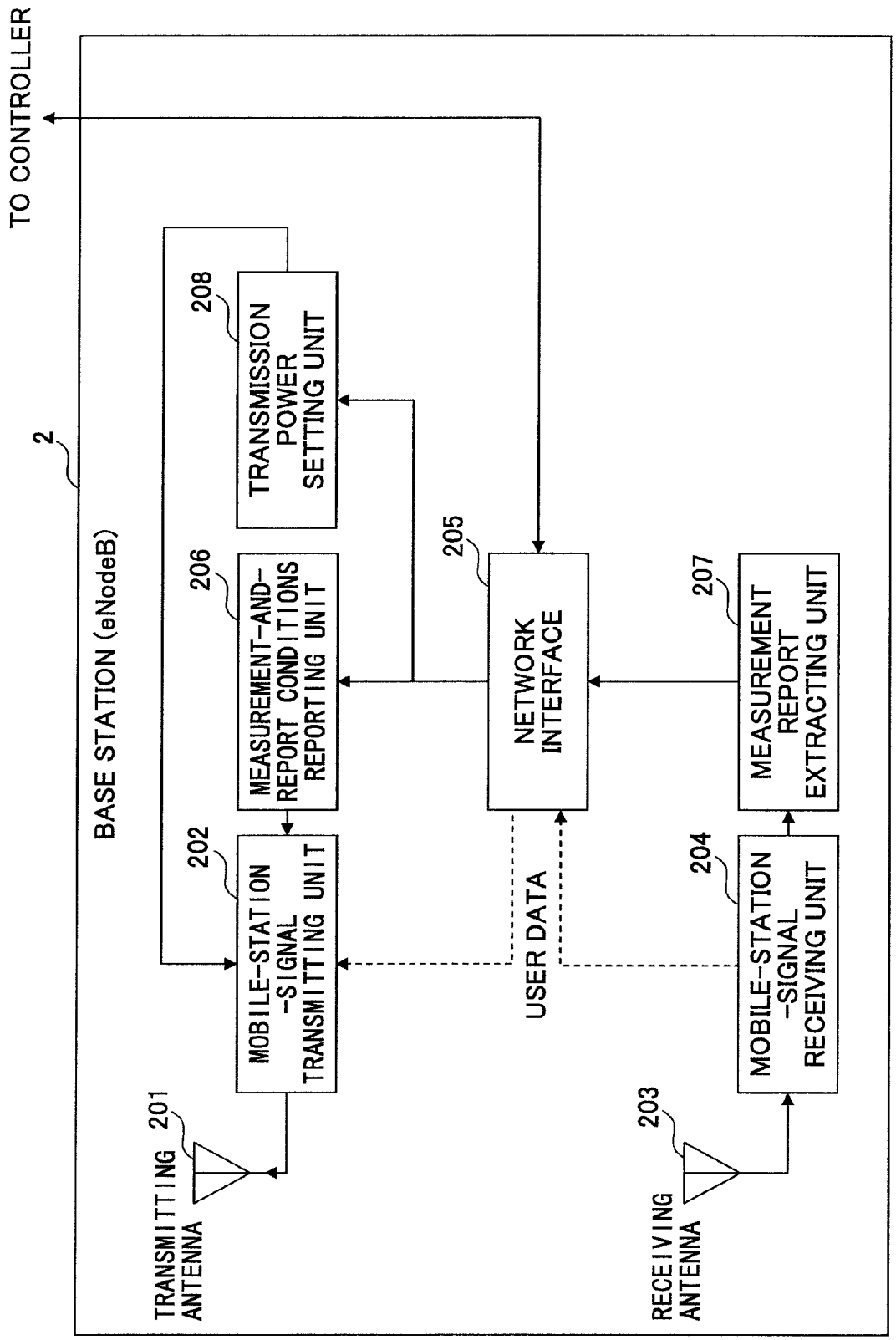
FIG. 4 is a block diagram illustrating an exemplary configuration of a base station according to the first embodiment.

FIG. 4 is a block diagram illustrating an exemplary configuration of a base station 2 (2#1, 2#2) according to the first embodiment.

As shown in FIG. 4, the base station 2 includes a mobile-station-signal transmitting unit 202 for transmitting signals to mobile stations via a transmitting antenna 201; a mobile-station-signal receiving unit 204 for receiving signals from mobile stations via a receiving antenna 203; and a network interface 205 connected to an upper node, i.e., the controller 1 and configured to transfer user data to be transmitted by the mobile-station-signal transmitting unit 202, to transfer user data received by the mobile-station-signal receiving unit 204, and to input and output control data to and from other components of the base station 2.

The base station 2 also includes a measurement-and-report conditions reporting unit 206 that requests the mobile-station-signal transmitting unit 202 to transmit (to broadcast via a common control channel) a measurement condition and a report condition received via the network interface 205 from the controller 1 to mobile stations; a measurement report extracting unit 207 that extracts measurement reports (for its own base station and other base stations) received from the mobile stations by the mobile-station-signal receiving unit 204 and transmits the extracted measurement reports via the network interface 205 to the controller 1; and a transmission power setting unit 208 that changes the current transmission power level of the common control channel set in a radio unit of the mobile-station-signal transmitting unit 202 based on a transmission power level received via the network interface 205 from the controller 1.

Figure 5:
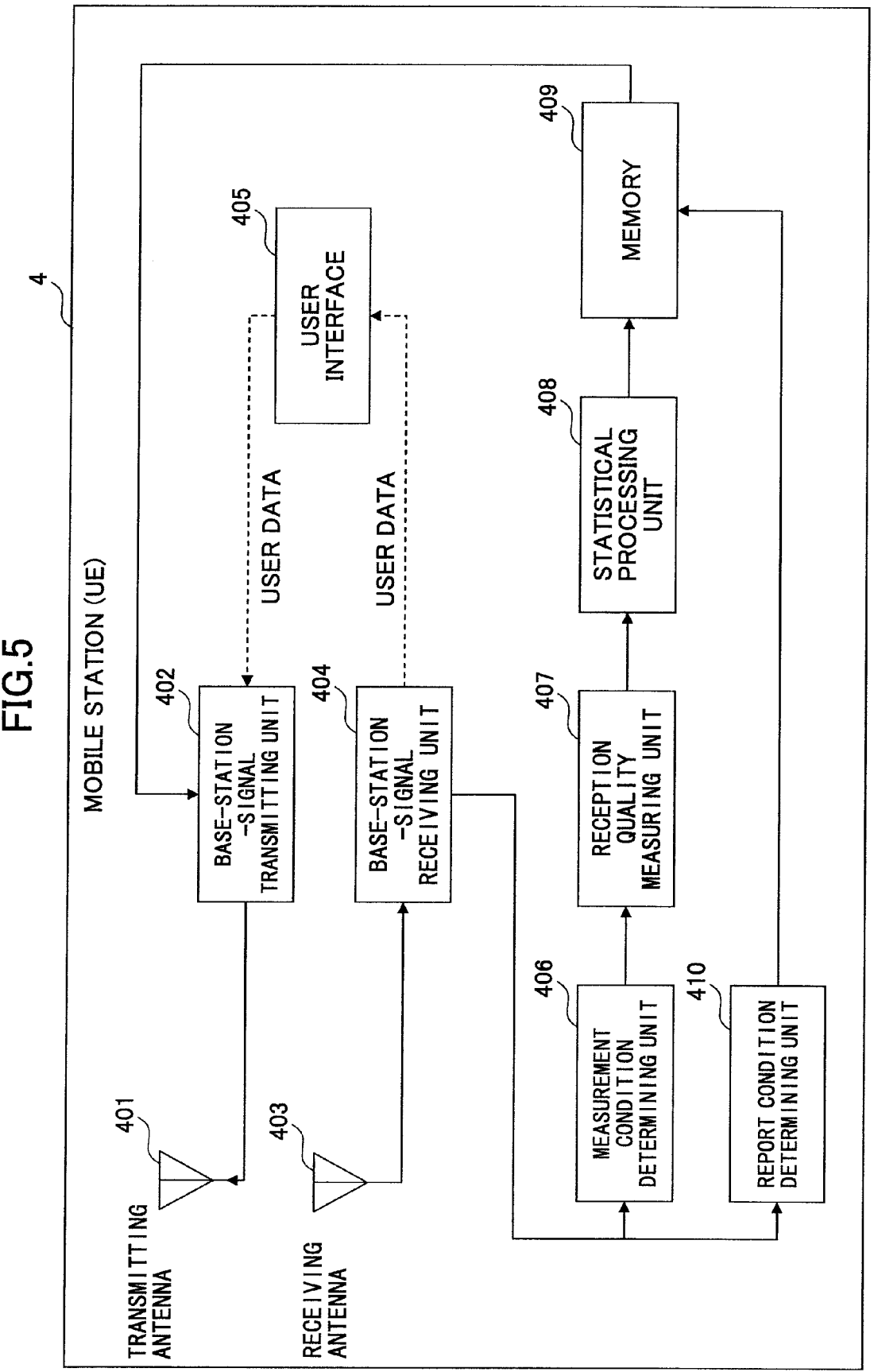
FIG. 5 is a block diagram illustrating an exemplary configuration of a mobile station.

FIG. 5 shows an exemplary configuration of a base station 4 (4#1-4#3) which is common to the first embodiment and a second embodiment described later.

As shown in FIG. 5, the mobile station 4 includes a base-station-signal transmitting unit 402 for transmitting signals to base stations via a transmitting antenna 401; a base-station-signal receiving unit 404 for receiving signals from base stations via a receiving antenna 403; and a user interface 405 (such as a mike, a speaker, a display, and/or buttons) that sends user data to the base-station-signal transmitting unit 402 and receives user data from the base-station-signal receiving unit 404.

The mobile station 4 also includes a measurement condition determining unit 406 that obtains, from the base-station-signal receiving unit 404, a measurement condition reported via a common control channel and determines to measure the reception quality if the measurement condition is satisfied; and a reception quality measuring unit 407 that measures the reception quality if the measurement condition determining unit 406 determines to measure the reception quality. The reception quality is measured, for example, by performing cyclic redundancy checking (CRC) on common control channels received from base stations.

Also, the mobile station 4 includes a statistical processing unit 408 that performs statistical processing (e.g., obtains an average, a median, and/or a probability distribution) on the reception quality measured by the reception quality measuring unit 407 for respective channel types and sectors; and a memory 409 for storing the results of the statistical processing (reception quality) in association with the respective channel types and sectors. In related-art mobile stations, measured reception quality is either not stored or stored only for a very short period of time. In this embodiment, the measured reception quality is stored in the memory 409 for a relatively long period of time.

The mobile station 4 further includes a report condition determining unit 410 that obtains, from the base-station-signal receiving unit 404, a report condition reported via a common control channel, determines to report the reception quality if the report condition is satisfied, and requests the base-station-signal transmitting unit 402 to transmit the reception quality stored in the memory 409 as a measurement report to the corresponding base station. The measurement report includes the measured reception quality and the cell ID of the corresponding base station.

Figure 6:
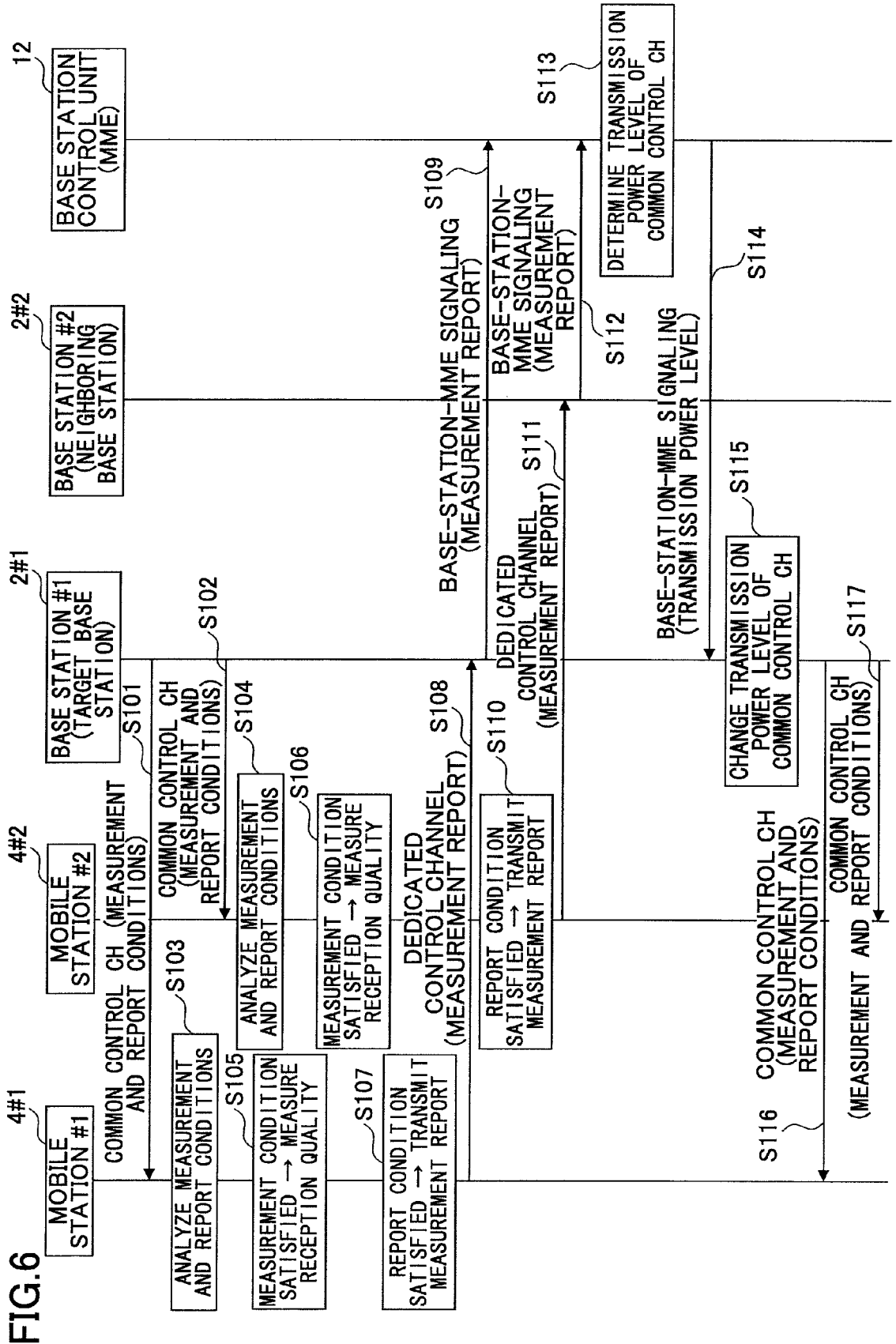
FIG. 6 is a sequence chart showing an exemplary process according to the first embodiment.

FIG. 6 is a sequence chart showing an exemplary process according to the first embodiment.

In FIG. 6, the base station 2#1 reports measurement condition and a report condition via a common control channel to the mobile station 4#1 (step S101), and also reports the measurement condition and the report condition via the common control channel to the mobile station 4#2 (step S102). The mobile station 4#1 and the mobile station 4#2, respectively, analyze the measurement and report conditions (steps S103 and S104). The common control channel is repeatedly transmitted at predetermined intervals.

If the measurement condition is satisfied, the mobile station 4#1 measures the reception quality (step S105). Similarly, if the measurement condition is satisfied, the mobile station 4#2 measures the reception quality (step S106).

Then, if the report condition is satisfied, the mobile station 4#1 starts a reporting process (step S107) and transmits a measurement report including the measured reception quality via a dedicated control channel to the base station 2#1 (step S108). When receiving the measurement report, the base station 2#1 transfers the measurement report via base-station-MME signaling to the base station control unit 12 (step S109).

Similarly, if the report condition is satisfied, the mobile station 4#2 starts a reporting process (step S110) and transmits a measurement report including the measured reception quality via a dedicated control channel to the base station 2#2 (step S111). When receiving the measurement report, the base station 2#2 transfers the measurement report via base-station-MME signaling to the base station control unit 12 (step S112).

The base station control unit 12 determines a transmission power level of the common control channel of the base station 2#1 based on the transferred measurement reports (step S113) and reports the determined transmission power level via base-station-MME signaling to the base station 2#1 (step S114). Then, the base station 2#1 changes the current transmission power level of the common control channel based on the reported transmission power level (step S115).

Thereafter, the base station 2#1 repeatedly reports the measurement condition and the report condition via the common control channel to the mobile station 4#1 and the mobile station 4#2 (steps S116 and S117), and the above steps are repeated.

The above process makes it possible to appropriately adjust the transmission power level of a common control channel in a service area and thereby makes it possible to maintain a desired reception quality level. The measurement and statistical processing of reception quality and the transmission power control for the common control channel may be performed for each scheduling unit (SU).

Second Embodiment

According to a second embodiment, functions for implementing the present invention are provided in the base station 2 (2#1, 2#2) instead of in the base station control unit 12 of the controller 1.

In this embodiment, it is assumed that the mobile communication system has a configuration as shown in FIG. 1. It is also assumed that the mobile stations 4 have substantially the same configuration as that shown in FIG. 5.

FIG. 7 is a block diagram illustrating an exemplary configuration of a base station control unit 12 according to the second embodiment.

As shown in FIG. 7, the base station control unit 12 includes a network interface 121 that communicates with other controllers and base stations belonging to the controller 1 via fixed lines; a base-station-signal transmitting unit 122 for transmitting signals to the base stations via the network interface 121; and a base-station-signal receiving unit 123 for receiving measurement reports from the base stations via the network interface 121.

The base station control unit 12 also includes a measurement-and-report conditions generating unit 124 that generates a measurement condition (a condition for determining whether to measure the reception quality) and a report condition (a condition for determining whether to report a measurement report) for mobile stations based on operational data received via the network interface 121, and requests the base-station-signal transmitting unit 122 to transmit the generated conditions to the corresponding base stations. Examples of the measurement condition include "if a request is received from the network", "if a predetermined period of time has passed after a request is received from the network", "if it is a predetermined time slot", "if one of base stations being detected becomes undetectable", "if a base station is newly detected and its reception level exceeds a threshold", and "if the mobile station has moved to another cell". Examples of the report condition include "if a request is received from the network", "if a predetermined period of time has passed after a request is received from the network", "if it is a predetermined time slot", and "if the mobile station moves to another tracking area (TA) for location registration". The measurement-and-report conditions generating unit 124 may be configured to request only a certain group of mobile stations (for example, mobile stations whose battery energy levels are high or mobile stations belonging to a certain access service class) to measure and report the reception quality.

The base station control unit 12 also includes a desired quality generating unit 125 that generates a desired quality level based on operational data received via the network interface 121 and requests the base-station-signal transmitting unit 122 to transmit the generated desired quality level to a target base station. The desired quality level is represented, for example, by a BER, a FER, a BLER, and/or the number of tries needed to complete demodulation.

The base station control unit 12 further includes a measurement report transfer unit 128 that requests the base-station-signal transmitting unit 122 to transfer measurement reports received by the base-station-signal receiving unit 123 to a corresponding base station.

FIG. 8 is a block diagram illustrating an exemplary configuration of a base station 2 according to the second embodiment.

As shown in FIG. 8, the base station 2 includes a mobile-station-signal transmitting unit 202 for transmitting signals to mobile stations via a transmitting antenna 201; a mobile-station-signal receiving unit 204 for receiving signals from mobile stations via a receiving antenna 203; and a network interface 205 connected to an upper node, i.e., the controller 1 and configured to transfer user data to be transmitted by the mobile-station-signal transmitting unit 202, to transfer user data received by the mobile-station-signal receiving unit 204, and to input and output control data to and from other components of the base station 2.

The base station 2 also includes a measurement-and-report conditions reporting unit 206 that requests the mobile-station-signal transmitting unit 202 to transmit (to broadcast via a common control channel) a measurement condition and a report condition received via the network interface 205 from the controller 1 to mobile stations; and a measurement report extracting unit 207 that extracts measurement reports (for its own base station and other base stations) received from the mobile stations by the mobile-station-signal receiving unit 204, sends the measurement reports for its own base station to a subsequent processing component, and transfers the measurement reports for other base stations to the controller 1 via the network interface 205.

The base station 2 also includes a desired quality input unit 209 that receives a desired quality level received via the network interface 205 from the controller 1 and inputs the received desired quality level to a transmission power determining unit 211 described later.

The base station 2 further includes a measurement report accumulating unit 210 that accumulates the measurement reports for its own base station received from the measurement report extracting unit 207 or the network interface 205 and performs statistical processing on the accumulated measurement reports (e.g., obtains an average, a median, and/or a probability distribution of the measurement reports); and the transmission power determining unit 211 that determines an appropriate transmission power level of the common control channel based on the results of the statistical processing output from the measurement report accumulating unit 210 and the desired quality level input from the desired quality input unit 209 and sets the determined transmission power level in a radio unit of the mobile-station-signal transmitting unit 202.

Here, the determined transmission power level may also be set in base stations other than the base station whose common control channel is measured.

FIG. 9 is a sequence chart showing an exemplary process according to the second embodiment.

In FIG. 9, the base station 2#1 reports a measurement condition and a report condition via a common control channel to the mobile station 4#1 (step S201), and also reports the measurement condition and the report condition via the common control channel to the mobile station 4#2 (step S202). The mobile station 4#1 and the mobile station 4#2, respectively, analyze the measurement and report conditions (steps S203 and S204). The common control channel is repeatedly transmitted at predetermined intervals.

If the measurement condition is satisfied, the mobile station 4#1 measures the reception quality (step S205). Similarly, if the measurement condition is satisfied, the mobile station 4#2 measures the reception quality (step S206).

Then, if the report condition is satisfied, the mobile station 4#1 starts a reporting process (step S207) and transmits a measurement report including the measured reception quality via a dedicated control channel to the base station 2#1 (step S208). If the measurement report is for the base station 2#1, the base station 2#1 stores the measurement report.

Similarly, if the report condition is satisfied, the mobile station 4#2 starts a reporting process (step S209) and transmits a measurement report including the measured reception quality via a dedicated control channel to the base station 2#2 (step S210). If the measurement report is not for the base station 2#2 but for the base station 2#1, the base station 2#2 transfers the measurement report via base-station-MME signaling to the base station control unit 12 (step S211).

Then, the base station control unit 12 starts a transfer process (step S212) and transfers the measurement report received from the base station 2#2 to the base station 2#1 via base-station-MME signaling (step S213).

The base station 2#1 accumulates received measurement reports and determines a transmission power level of the common control channel based on the accumulated measurement reports (step S214) and changes the current transmission power level of the common control channel based on the determined transmission power level (step S215).

Thereafter, the base station 2#1 repeatedly reports the measurement condition and the report condition via the common control channel to the mobile station 4#1 and the mobile station 4#2 (steps S216 and S217), and the above steps are repeated.

The above process makes it possible to appropriately adjust the transmission power level of a common control channel in a service area and thereby makes it possible to maintain a desired reception quality level. The measurement and statistical processing of reception quality and the transmission power control for the common control channel may be performed for each scheduling unit (SU).

SUMMARY

The above embodiments of the present invention make it possible:

(1) To control radio parameters based on actual measurements without using a simulation and thereby to prevent problems caused by simulation errors.

(2) To appropriately adjust the transmission power of a common control channel of the base station according to current situations, and thereby to maintain the reception quality at the mobile station even if propagation and interference conditions vary.

(3) To prevent use of excessive transmission power for a common control channel and thereby to reduce inter-cell interference.

(4) To automatically control radio parameters without requiring manual measurement and configurations and thereby to reduce the workload of the telecommunications carrier.

Preferred embodiments of the present invention are described above. However, the present invention is not limited to the specifically disclosed embodiments, and variations and modifications may be made without departing from the scope of the present invention. Accordingly, the descriptions and drawings in the above embodiments should not be construed to be limiting the present invention.

The present international application claims priority from Japanese Patent Application No. 2007-120262 filed on Apr. 27, 2007, the entire contents of which are hereby incorporated herein by reference.

The invention claimed is:

1. A mobile communication system, comprising:
a condition reporting unit provided in a base station controller, which is an upper node of a target base station, and configured to report to a mobile station via the target base station or another base station a measurement condition and a report condition used by the mobile station to determine whether to measure and report a reception quality level of a radio signal transmitted from the target base station;
a measurement reporting unit provided in the mobile station and configured to measure the reception quality level of the radio signal transmitted from the target base station if the measurement condition is satisfied and to report the measured reception quality level to the base station controller via the target base station or the other base station if the report condition is satisfied;
a measurement report accumulating unit provided in the base station controller and configured to accumulate reception quality levels reported from plural mobile stations and perform statistical processing on the accumulated reception quality levels;
a desired quality generating unit provided in the base station controller and configured to generate a desired quality level based on operational data comprising a bit error rate (BER), a frame error rate (FER), a block error rate (BLER), and a number of tries needed to complete demodulation; and
a radio parameter control unit provided in the base station controller and configured to automatically control a radio parameter of the target base station or the other base station based on the desired quality level and a result of the statistical processing.

2. The mobile communication system as claimed in claim 1, wherein each of the target base station and the other base station comprises:
a condition reporting unit configured to receive from the base station controller the measurement condition and the report condition and to report the measurement condition and the report condition to the mobile station;
a measurement transfer unit configured to receive from the mobile station the measured reception quality level of the radio signal transmitted from the target base station and to transfer the received reception quality level to the base station controller; and
a parameter setting unit configured to set the radio parameter transmitted from the base station controller in its own base station.

3. A mobile communication system, comprising:
a condition reporting unit provided in a base station controller, which is an upper node of a target base station, and configured to report to a mobile station via the target base station or another base station a measurement condition and a report condition used by the mobile station to determine whether to measure and report a reception quality level of a radio signal transmitted from the target base station;
a measurement reporting unit provided in the mobile station and configured to measure the reception quality level of the radio signal transmitted from the target base station if the measurement condition is satisfied and to report the measured reception quality level to the target base station directly or via the other base station and the base station controller if the report condition is satisfied;
a measurement report accumulating unit provided in the target base station and configured to accumulate reception quality levels reported from plural mobile stations and perform statistical processing on the accumulated reception quality levels;
a desired quality generating unit provided in the base station controller and configured to generate a desired quality level based on operational data comprising a bit error rate (BER), a frame error rate (FER), a block error rate (BLER), and a number of tries needed to complete demodulation and to transmit the desired quality level to the target base station; and
a radio parameter control unit provided in the target base station and configured to automatically control a radio parameter of the target base station or the other base station based on the desired quality level and a result of the statistical processing.

4. The mobile communication system as claimed in claim 3, wherein the base station controller comprises:
a measurement transfer unit configured to receive the measured reception quality level of the radio signal transmitted from the target base station from the mobile station via the other base station and to transfer the received reception quality level to the target base station.

5. A base station controller, comprising:
a condition reporting unit configured to report to a mobile station via a target base station or another base station a measurement condition and a report condition used by the mobile station to determine whether to measure and report a reception quality level of a radio signal transmitted from the target base station;
a measurement receiving unit configured to receive the measured reception quality level of the radio signal transmitted from the target base station from the mobile station via the target base station or the other base station;
a measurement report accumulating unit configured to accumulate reception quality levels reported from plural mobile stations and perform statistical processing on the accumulated reception quality levels;
a desired quality generating unit configured to generate a desired quality level based on operational data comprising a bit error rate (BER), a frame error rate (FER), a block error rate (BLER), and a number of tries needed to complete demodulation; and
a radio parameter control unit configured to automatically control a radio parameter of the target base station or the other base station based on the desired quality level and a result of the statistical processing.

6. A base station, comprising:
a condition reporting unit configured to receive from a base station controller a measurement condition and a report condition used by a mobile station to determine whether to measure and report a reception quality level of a radio signal transmitted from a target base station that is either its own base station or another base station and to report the measurement condition and the report condition to the mobile station;

a measurement receiving unit configured to receive the measured reception quality level of the radio signal transmitted from the target base station from the mobile station directly or via the other base station and the base station controller;

a measurement report accumulating unit configured to accumulate reception quality levels reported from plural mobile stations and perform statistical processing on the accumulated reception quality levels; and a radio parameter control unit configured to automatically control a radio parameter of its own base station or the other base station based on a result of the statistical processing and a desired quality level generated by the base station controller based on operational data comprising a bit error rate (BER), a frame error rate (FER), a block error rate (BLER), and a number of tries needed to complete demodulation.

7. A base station radio parameter control method, comprising:

a condition reporting step, performed by a base station controller that is an upper node of a target base station, of reporting to a mobile station via the target base station a measurement condition and a report condition used by the mobile station to determine whether to measure and report a reception quality level of a radio signal transmitted from the target base station;

a measurement reporting step, performed by the mobile station, of measuring the reception quality level of the radio signal transmitted from the target base station if the measurement condition is satisfied and reporting the measured reception quality level to the base station controller via the target base station or another base station if the report condition is satisfied;

a measurement report accumulating step, performed by the base station controller, of accumulating reception quality levels reported from plural mobile stations and performing statistical processing on the accumulated reception quality levels;

a desired quality generating step, performed by the base station controller, of generating a desired quality level based on operational data comprising a bit error rate (BER), a frame error rate (FER), a block error rate (BLER), and a number of tries needed to complete demodulation; and a radio parameter control step, performed by the base station controller, of automatically controlling a radio parameter of the target base station or the other base station based on the desired quality level and a result of the statistical processing.

8. A base station radio parameter control method, comprising:

a condition reporting step, performed by a base station controller that is an upper node of a target base station, of reporting to a mobile station via the target base station a measurement condition and a report condition used by the mobile station to determine whether to measure and report a reception quality level of a radio signal transmitted from the target base station;

a measurement reporting step, performed by the mobile station, of measuring the reception quality level of the radio signal transmitted from the target base station if the measurement condition is satisfied and reporting the measured reception quality level to the target base station directly or via another base station and the base station controller if the report condition is satisfied;

a measurement report accumulating step, performed by the target base station, of accumulating reception quality levels reported from plural mobile stations and performing statistical processing on the accumulated reception quality levels;

a desired quality generating step, performed by the base station controller, of generating a desired quality level based on operational data comprising a bit error rate (BER), a frame error rate (FER), a block error rate (BLER), and a number of tries needed to complete demodulation and transmitting the desired quality level to the target base station; and a radio parameter control step, performed by the target base station, of automatically controlling a radio parameter of the target base station or the other base station based on the desired quality level and a result of the statistical processing.

* * * * *